(No Model.)
F. PRINZ.
Machine for Scouring and Cleaning Wheat, &c.
No. 242,153. Patented May 31, 1881.
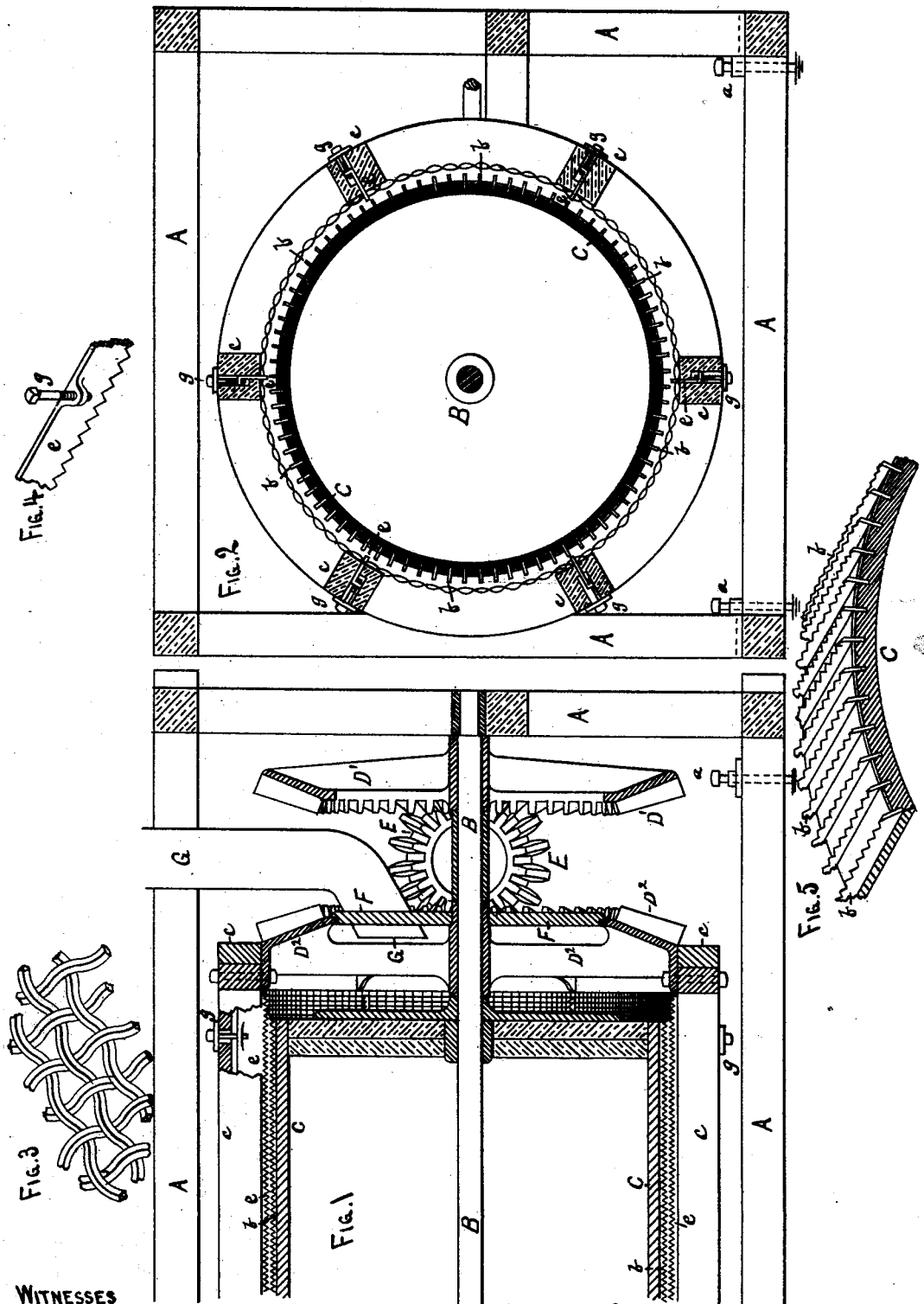

UNITED STATES PATENT OFFICE.

FAUSTIN PRINZ, OF DUNDAS, MINNESOTA, ASSIGNOR OF ONE-HALF TO JOSEPH K. GEHRIG, OF SAME PLACE.

MACHINE FOR SCOURING AND CLEANING WHEAT, &c.

SPECIFICATION forming part of Letters Patent No. 242,153, dated May 31, 1881.

Application filed May 3, 1880. (No model.)

*To all whom it may concern:*

Be it known that I, FAUSTIN PRINZ, of Dundas, in the county of Rice and State of Minnesota, have invented certain Improvements in Machines for Scouring and Cleaning Wheat and other Grains, of which the following is a specification.

This invention relates to machines for scouring and cleaning wheat, &c.; and it consists in two horizontal cylinders revolving in opposite directions, one inside of the other, with a small space between them, in which the grain is operated upon, the outer cylinder being covered with wire-cloth made of wire of a square or oblong form, and provided with a series of longitudinal adjustable blades with serrated edges, while the inner cylinder is armed with similar blades of a greater number, the grain being caught between these blades and the cylinders and rolled over and over against the sharp edges of the wire-cloth, and thus scoured and rubbed, as hereinafter set forth. I attain these objects by the mechanism illustrated in the accompanying drawings, in which—

Figure 1 is a sectional side elevation of a portion of the forward end of the machine, and Fig. 2 is a cross-sectional view. Fig. 3 is a perspective view of a portion of the wire-cloth covering of the outer cylinder. Fig. 4 is a perspective view of a portion of one of the serrated blades of the outer cylinder detached, showing its method of adjustment. Fig. 5 is a perspective view of a portion of the shell of the inner cylinder enlarged, showing the method of arranging its serrated armor or blades.

A is the frame, which may be made of any desired form or material, and provided with set-screws $a$, by which it may be leveled or adjusted to any desired angle.

B is a central shaft, upon which a cylinder, C, is mounted and adapted to be revolved by a bevel-gear wheel, $D'$, upon the same shaft B. This cylinder C is covered with sheet-iron and provided with longitudinal ribs or blades $b$, having their edges serrated or cut into saw-tooth-shaped notches, as shown. These blades will be placed at equal distances apart, ordinarily about one (1) inch, although the distance apart and the number of blades may be varied to suit different circumstances.

Outside of the cylinder C is another cylinder formed of arms or ribs $c$, of any desired number, but ordinarily six, as in the drawings, and connected at one end to the rim of a bevel-gear wheel, $D^2$, of the same number and size of teeth as the gear $D'$, and mounted loosely upon the same shaft B, so that one pinion, E, will operate both gears, while the other ends of the arms $c$ will be connected to a circular plate centered loosely upon the shaft B. By this arrangement the cylinders will be revolved in opposite directions. The arms $c$ thus placed form a base upon which wire-cloth will be secured. This cloth will be made of wire of a square or oblong form, so as to present sharp corners to the grain, (see Fig. 3,) while from the inside of each arm $c$ long blades, $e$, project, their inner edges being provided with serrations or saw-tooth-shaped notches like the blades $b$, the two sets of blades, $b$ and $e$, running far enough apart to prevent injury to the grain. The blades $e$ will be made adjustable by set-screws $g$, (see Figs. 1, 2, and 4,) so that the distance between them and the blades $b$ may be varied to suit different kinds and conditions of grain.

F is a disk or plate arranged to be held stationary by the spout G, while at the same time the wheel $D^2$ is free to revolve against its periphery to prevent the escape of the grain from the cylinders.

The grain is run in by the spout G, and the two cylinders running in opposite directions it is caught by the serrated blades $b$ $e$ and thoroughly intermingled and forced against the sharp edges of the wire-cloth $d$, thus rubbing and scouring it until all rough surfaces and the fuzzy ends of the berries are removed, and the grain passes out at the opposite end of the machine cleaned and scoured, while the smut and dust, &c., pass through the meshes of the wire-cloth and escape.

The cylinders may be made of any desired size or length.

Revolving the cylinders in opposite directions is a very important feature of my invention, as they more thoroughly act upon the grain than if only one were revolved.

A great advantage is gained by the use of the two sets of horizontal parallel saw-toothedged blades b c, working against each other, as the grain is thereby held longer in contact with the surfaces of the cylinders and blades, so that the same kernels are acted upon more frequently by the blades, &c., than if they were arranged in a screw form or the cylinders set in an upright position.

Under some circumstances ordinary round wire may be used for the cloth d, or roughened iron or cards, as used in carding wool, or plates of chilled iron with small points cast on them, may be used, but ordinarily I prefer the sharp-cornered wire shown.

What I claim as new is—

The inner cylinder mounted upon a horizontal shaft, B, and provided with the serrated-edged blades b, in close proximity to and parallel with each other and with the shaft B, and adapted to be revolved in one direction, in combination with an outer cylinder adapted to be revolved in the opposite direction and covered with wire-cloth made of square or other sharp-cornered wire, and provided with adjustable serrated blades c, parallel with the blades b, arranged and operating substantially as set forth.

In testimony whereof I have hereunto set my hand in the presence of two subscribing witnesses.

FAUSTIN PRINZ.

Witnesses:
 C. N. WOODWARD,
 LOUIS FREESER.